US009183215B2

(12) United States Patent
Smiling (10) Patent No.: US 9,183,215 B2
(45) Date of Patent: Nov. 10, 2015

(54) MOSAIC DISPLAY SYSTEMS AND METHODS FOR INTELLIGENT MEDIA SEARCH

(71) Applicant: SHUTTERSTOCK, INC., New York, NY (US)

(72) Inventor: Eric J. Smiling, New York, NY (US)

(73) Assignee: SHUTTERSTOCK, INC., New York, NY (US)

( * ) Notice: Subject to any disclaimer, the term of this patent is extended or adjusted under 35 U.S.C. 154(b) by 314 days.

(21) Appl. No.: 13/730,896

(22) Filed: Dec. 29, 2012

(65) Prior Publication Data

US 2014/0188843 A1 Jul. 3, 2014

(51) Int. Cl.
G06F 17/30 (2006.01)

(52) U.S. Cl.
CPC ...... *G06F 17/30112* (2013.01); *G06F 17/3005* (2013.01)

(58) Field of Classification Search
CPC .......... G06F 17/30256; G06F 17/30259; G06F 17/3087; G06F 17/3089; G06F 17/30047; G06F 17/3005; G06F 17/30112; G06F 17/30554
USPC ............ 707/E17.014, 769, 722, E17.005, 707/E17.141, 706; 715/234, 738, 764, 810, 715/202, 221, 758, 760, 780, 815, 838, 715/856; 705/14.54, 14.43, 14.49, 14.73, 705/26.63, 7.12; 709/203, 217, 219
See application file for complete search history.

(56) References Cited

U.S. PATENT DOCUMENTS

| | | | |
|---|---|---|---|
| 4,952,922 A | 8/1990 | Griffin | |
| 5,091,960 A | 2/1992 | Butler | |
| 6,337,691 B1 | 1/2002 | Trainor | |
| 6,338,062 B1 | 1/2002 | Liu | |
| 6,502,105 B1 | 12/2002 | Yan | |
| 6,529,242 B1 | 3/2003 | Panicacci | |
| 6,654,022 B1 | 11/2003 | Egan | |
| 6,671,424 B1 | 12/2003 | Skoll | |
| 6,763,137 B1 | 7/2004 | Krtolica | |
| 6,865,302 B2 | 3/2005 | Chang | |
| 6,901,378 B1 | 5/2005 | Linker | |
| 6,956,899 B2 | 10/2005 | Hall | |

(Continued)

OTHER PUBLICATIONS

Shutter Stock for Ipad (Internet Archive WayBackMachine, http://www.shutterstock.om/app.mhtml, Dec. 15, 2012).*

(Continued)

*Primary Examiner* — Jay Morrison
*Assistant Examiner* — Ken Hoang
(74) *Attorney, Agent, or Firm* — McDermott Will & Emery LLP (57) ABSTRACT

A computer image search system for rapid retrieval of media files images configured to determine a grid width attribute, and a height attribute, a width attribute and an aspect ratio attribute for each media file. The system configured to iteratively process each media file by determining a next media file, an average height and average width of the media files, reconfiguring the media files such that each of the reconfigured media files has the average height and the average width attribute, determining a total image width attribute of the media files by adding the average width attribute for each of the media files, and configured to assign a designated position to a next media file on the grid while the total image width attribute is less than the grid width attribute, and to dynamically display each processed media file at a corresponding designated position on the grid.

35 Claims, 8 Drawing Sheets

(56) References Cited

U.S. PATENT DOCUMENTS

| | | | |
|---|---|---|---|
| 6,956,979 | B2 | 10/2005 | Janakiraman |
| 7,051,019 | B1 | 5/2006 | Land |
| 7,099,389 | B1 | 8/2006 | Yu |
| 7,113,944 | B2 | 9/2006 | Zhang |
| 7,181,678 | B2 | 2/2007 | Chundi |
| 7,236,652 | B2 | 6/2007 | Kasutani |
| 7,248,738 | B2 | 7/2007 | Ho |
| 7,257,567 | B2 | 8/2007 | Toshima |
| 7,440,638 | B2 | 10/2008 | Nagahashi |
| 7,529,732 | B2 | 5/2009 | Liu |
| 7,558,425 | B1 | 7/2009 | Syeda-Mahmood |
| 7,689,064 | B2 * | 3/2010 | Miksovsky et al. ............ 382/294 |
| 7,797,377 | B2 | 9/2010 | Linker |
| 7,836,044 | B2 | 11/2010 | Kamvar |
| 8,078,969 | B2 | 12/2011 | Harrison |
| 8,121,618 | B2 | 2/2012 | Rhoads |
| 8,140,518 | B2 | 3/2012 | Dasdan |
| 8,156,109 | B2 | 4/2012 | Kamvar |
| 8,175,617 | B2 | 5/2012 | Rodriguez |
| 8,194,986 | B2 | 6/2012 | Conwell |
| 8,255,495 | B1 | 8/2012 | Lee |
| 8,379,932 | B2 * | 2/2013 | Fukunishi ...................... 382/107 |
| 8,543,940 | B2 * | 9/2013 | Singhal et al. ................. 715/809 |
| 8,775,953 | B2 * | 7/2014 | Schulz ........................... 715/764 |
| 2005/0044485 | A1 * | 2/2005 | Mondry et al. ................ 715/502 |
| 2005/0116966 | A1 * | 6/2005 | Graham et al. ................ 345/661 |
| 2005/0147322 | A1 * | 7/2005 | Saed ............................... 382/284 |
| 2007/0296824 | A1 * | 12/2007 | Paine et al. .................. 348/222.1 |
| 2008/0205789 | A1 | 8/2008 | Ten Kate |
| 2008/0291221 | A1 * | 11/2008 | Yamada et al. ................ 345/660 |
| 2009/0064029 | A1 | 3/2009 | Corkran |
| 2010/0048242 | A1 | 2/2010 | Rhoads |
| 2010/0199227 | A1 * | 8/2010 | Xiao et al. ..................... 715/863 |
| 2010/0205628 | A1 | 8/2010 | Davis |
| 2010/0262512 | A1 | 10/2010 | Lee |
| 2010/0277754 | A1 | 11/2010 | Arimura |
| 2011/0034176 | A1 | 2/2011 | Lord |
| 2011/0074824 | A1 | 3/2011 | Srinivasan |
| 2011/0096075 | A1 * | 4/2011 | Borders et al. ................ 345/441 |
| 2011/0098029 | A1 | 4/2011 | Rhoads |
| 2011/0098056 | A1 | 4/2011 | Rhoads |
| 2011/0143811 | A1 | 6/2011 | Rodriguez |
| 2011/0161076 | A1 | 6/2011 | Davis |
| 2011/0173183 | A1 | 7/2011 | Dasdan |
| 2011/0173214 | A1 | 7/2011 | Karim |
| 2011/0197237 | A1 | 8/2011 | Turner |
| 2011/0202557 | A1 | 8/2011 | Atsmon |
| 2011/0212717 | A1 | 9/2011 | Rhoads |
| 2011/0244919 | A1 | 10/2011 | Aller |
| 2011/0258183 | A1 | 10/2011 | Gibbs |
| 2011/0280447 | A1 | 11/2011 | Conwell |
| 2011/0281566 | A1 | 11/2011 | Davis |
| 2011/0282793 | A1 | 11/2011 | Mercuri |
| 2011/0282947 | A1 | 11/2011 | Dodson |
| 2011/0282965 | A1 | 11/2011 | Dodson |
| 2011/0283305 | A1 | 11/2011 | Davis |
| 2011/0283306 | A1 | 11/2011 | Davis |
| 2011/0283310 | A1 | 11/2011 | Davis |
| 2011/0283319 | A1 | 11/2011 | Davis |
| 2011/0283328 | A1 | 11/2011 | Davis |
| 2011/0295722 | A1 | 12/2011 | Reisman |
| 2011/0320019 | A1 | 12/2011 | Lanciani |
| 2012/0050525 | A1 | 3/2012 | Rinner |
| 2012/0054649 | A1 | 3/2012 | McDonald |
| 2012/0075433 | A1 | 3/2012 | Tatzgern |
| 2012/0076471 | A1 | 3/2012 | Ciudad |
| 2012/0114249 | A1 | 5/2012 | Conwell |
| 2012/0149432 | A1 | 6/2012 | Lablans |
| 2012/0149470 | A1 | 6/2012 | Dasdan |
| 2012/0154562 | A1 * | 6/2012 | Munzenmayer et al. ....... 348/65 |
| 2012/0165046 | A1 | 6/2012 | Rhoads |
| 2012/0190404 | A1 | 7/2012 | Rhoads |
| 2012/0191508 | A1 | 7/2012 | Gross |
| 2012/0191619 | A1 | 7/2012 | Gross |
| 2012/0191757 | A1 | 7/2012 | Gross |
| 2012/0209586 | A1 | 8/2012 | Mieritz |
| 2012/0218436 | A1 | 8/2012 | Conwell |
| 2012/0220311 | A1 | 8/2012 | Conwell |
| 2012/0229600 | A1 | 9/2012 | Kwon |
| 2012/0229613 | A1 | 9/2012 | Hasegawa |
| 2012/0230463 | A1 | 9/2012 | Morton |
| 2012/0230549 | A1 | 9/2012 | Takahashi |
| 2012/0232987 | A1 | 9/2012 | Everingham |
| 2012/0233141 | A1 | 9/2012 | Lambie |
| 2012/0233143 | A1 | 9/2012 | Everingham |
| 2012/0233196 | A1 | 9/2012 | Li |
| 2012/0236201 | A1 | 9/2012 | Amiotes |
| 2012/0239671 | A1 | 9/2012 | Campana |

OTHER PUBLICATIONS

Rui Xu, Donald Wunsch II, "Survey of Clustering Algorithms", IEEE Transactions on Neural Networks, vol. 16, No. 3, May 2005.

Ritendra Datta, Dhiraj Joshi, Jia Li, and James Z. Wang, "Image Retrieval: Ideas, Influences, and Trends of the New Age", ACM Computing Surveys, vol. 40, No. 2, Article 5, Publication date: Apr. 2008.

Mumtaz Ali, Awais Adnan, MuhammdSaqib and Zahidullah, Content Based Image Retrieval (CBIR) UsingMaterialized Views, International Conference on Computer Science and Information Technology (ICCSIT'2011) Pattaya Dec. 2011; 116-119.

Canny, J., "A computational approach to edge detection", IEEE Trans on Pattern Analysis and Machine Intelligence, 8:679-698, 1986.

S.Nandagopalan, Dr. B.S. Adiga, and N. Deepak "A Universal Model for Content-Based Image Retrieval" World Academy of Science, Engineering and Technology 46 2008.

Deng Cai, Xiaofei He, Zhiwei Li Wei-Ying Ma, and Ji-Rong Wen Hierarchical Clustering of WWW Image Search Results Using Visual, Textual and Link Information MM'04, Oct. 10-16, 2004, New York, New York, USA. pp. 952-959.

V. Castelli and L. D. Bergman (Eds.), "Image Databases: Search and Retrieval of digital Imagery", Wiley: New York, 2002.

B. Everitt, S. Landau, and M. Leese, "Cluster Analysis", London:Arnold, 2001.

Hao Liu, Xing Xie, Xiaoou Tang, Zhi-Wei Li, Wei-Ying Ma, Effective Browsing of Web Image Search Results, Microsoft Research Asia, MIR'04, Oct. 15-16, 2004, New York, New York, USA. Copyright 2004 ACM 1-58113-940-3/04/001.

Chaoli Wang, John P. Reese, Huan Zhang, Jun Tao, Robert J. Nemiroff, iMap—A Stable Layout for Navigating Large Image Collections with Embedded Search, Chaoli Wang, John P. Reese, Huan Zhang, Jun Tao, Robert J. Nemiroff Michigan Technological University, Computer Science Technical ReportCS-TR-12-01, Jan. 11, 2012; www.cs.mtu.edu/~chaoliw/research/vda13-imap.pdf.

S. Thilagamani and N. Shanthi , "A Survey on Image Segmentation Through Clustering", International Journal of Research and Reviews in Information Sciences , vol. 1, No. 1, Mar. 2011.

Huiyu Zhou*, Abdul H. Sadka, Mohammad R. Swash, Jawid Azizi and Abubakar S. Umar, Content Based Image Retrieval and Clustering: A Brief Survey, Recent Patents on Electrical Engineering 2009, 2, 187-199 187.

Smith J, Chang S-F. Visualseek: A fully automated content-based image query system. In multimedia'96: Proc. of the Fourth ACM Int Conf on Multimedia 1996; 87-98.

Wei-Ying Ma, B. S. Manjunath, NeTra: A toolbox for navigating large image databases, Multimedia Systems 7: 184-198 (1999) Multimedia Systems.

Wang JZ, Li J, Wiederhold G. Simplicity: Semantics-sensitive integrated matching for picture libraries. IEEE Trans Pattern Anal Machine Intell 2001; 23: 947-963.

Junyeong Yang, Sanghyuk Park, Hacheon Seong, Hyeran Byun, A Fast Image Retrieval System using Index Lookup Table on Mobile Device, IEEE (2008).

Eakins J, Graham M. Content-based image retrieval. University of Northumbria at Newcastle. Tech Rep Technical Report, 1999.

* cited by examiner

| Table 1 | | |
|---|---|---|
| Grid Width 20 inches | Image 1 | Image 2 |
| Initial Height in inches | 5 | 5 |
| Initial Width in inches | 5 | 10 |
| Average Height in inches | 5 | 5 |
| Average Width in inches | 7.5 | 7.5 |

FIG. 4a

| Table 2 | | | |
|---|---|---|---|
| Grid Width 20 cm | Image 1 | Image 2 | Image 3 |
| Initial Height in inches | 5 | 15 | 10 |
| Initial Width in inches | 15 | 10 | 15 |
| Height to width aspect ratio | 1:3 | 3:2 | 2:3 |
| Average Height in inches | 10 | 10 | 10 |
| Width in inches per aspect ratio | 30 | 6.67 | 15 |

MOSAIC DISPLAY SYSTEMS AND METHODS FOR INTELLIGENT MEDIA SEARCH

BACKGROUND

1. Field of Disclosure

The present disclosure generally relates to a media search and retrieval system, and, more particularly, to systems and methods for rapid retrieval of searched media files that uses a first database containing suggested search terms and associated pointers to media files in a second database for autocompleting user requests.

2. Brief Description of Related Art

Grid image design is a complex problem for creation of web pages across browsers. One fundamental problem in designing an image grid is that most web interface display systems are designed for displaying a text file. These display systems, often process images files and text files in the same manner. For example, when an image is displayed by default in line with the text, the existing display systems often leave a blank line or space at the bottom for descendenders (such as found in the letters "j," "g," and "y"), even though typically, an image will not have the above mentioned blank lines. Although some browsers account for this situation, the practice of taking into account the differences between displaying a text file and an image file is still not a standard practice in the industry. Several other technical issues may arise while displaying images on the web interfaces. Among them are having an asymmetrical balance while displaying images of different sizes on a single page, a decrease in latency of image display by the user, causing simultaneous display of multiple images, incorporating the thumbnail generation technology in displaying images, optimization of space in an image grid gallery and maintenance of consistency of visual hierarchy across devices and browsers. These technical issues are discussed in detail below.

The technique of asymmetrical display layout involves evenly distributing image elements within a grid format, which may involve balancing a large photograph with several small photographs. Uneven elements often present several potential possibilities for arranging the elements on the page and creating interesting layout designs rather than displaying a page containing a layout of perfectly symmetrical objects. Asymmetrical layouts are generally more dynamic, and by intentionally ignoring balance, the designer can create tension, express movement, or convey a mood such as anger, excitement, joy, or casual amusement. There inevitably is a certain latency time between the time the user enters a command by way of an I/O device (e.g. keyboard, IR remote control unit) to view a selected image, and the time when the selected image actually appears on the display screen. This latency time is largely due to the time required for locating the image data, reading the image data, and then loading the read-out image data into the image memory or in the client system display. Typically, this latency time could be as much as 1 to 4 seconds or long enough to be noticeable and inconvenient to the user. It would be desirable to minimize this latency time, such that the latency time is barely noticeable to the user.

Some user interface applications of image display systems involve displaying multiple images, for instance for side-by-side comparison. For instance, medical imaging applications and slide presentations are two applications in which display of two or more images in a side-by-side format can be useful. Also, consumers may want to compare images side-by-side, for instance, to select a preferred one of several portrait photos of the same person. In addition, users may wish to browse through a large library of images to select a plurality of images for display and download.

Although similarity-based visualization can help users find the right image quickly, especially for web images search results, some hurdles still need to be crossed in order to enable users to really enjoy the instantaneous and seamless display of the searched images. One problem in using similarity-based image visualization technique is difficulty in identifying an effective tool to measure the similarity between two images. Another problem is information loss caused by image down-sampling when an attempt is made to place more images on a single screen. Accordingly, a better thumbnail generation technology, other than directly down-sampling the searched images is needed to efficiently use the user interface space to effectively display the searched images.

There are several software image grid galleries that support dynamic width and height images. Among software packages that support these image galleries are jQuery Masonry, Tympanus Automatic Image Montage and CSS-Tricks Seamless Responsive Photo Grid, but each software package has a limitation. For example, Jquery Masonry allows for both width and height to be dynamic, but generates gaps between images. While the remaining software packages create aesthetically pleasing grids, these software packages hold either image width or image height as a static variable. Masonry is a dynamic grid layout plugin for jQuery, which can be considered as the flip-side of CSS floats. The CSS floating method arranges image elements horizontally on the user interface, before arranging the image elements vertically on the user interface. However, Masonry method arranges image elements vertically, positioning each image element in the next open spot in the grid. The resulting arrangement of image elements on the user interface minimizes vertical gaps between image elements of varying height, like a mason fitting stones in a horizontal line on a wall.

Figure 1A:
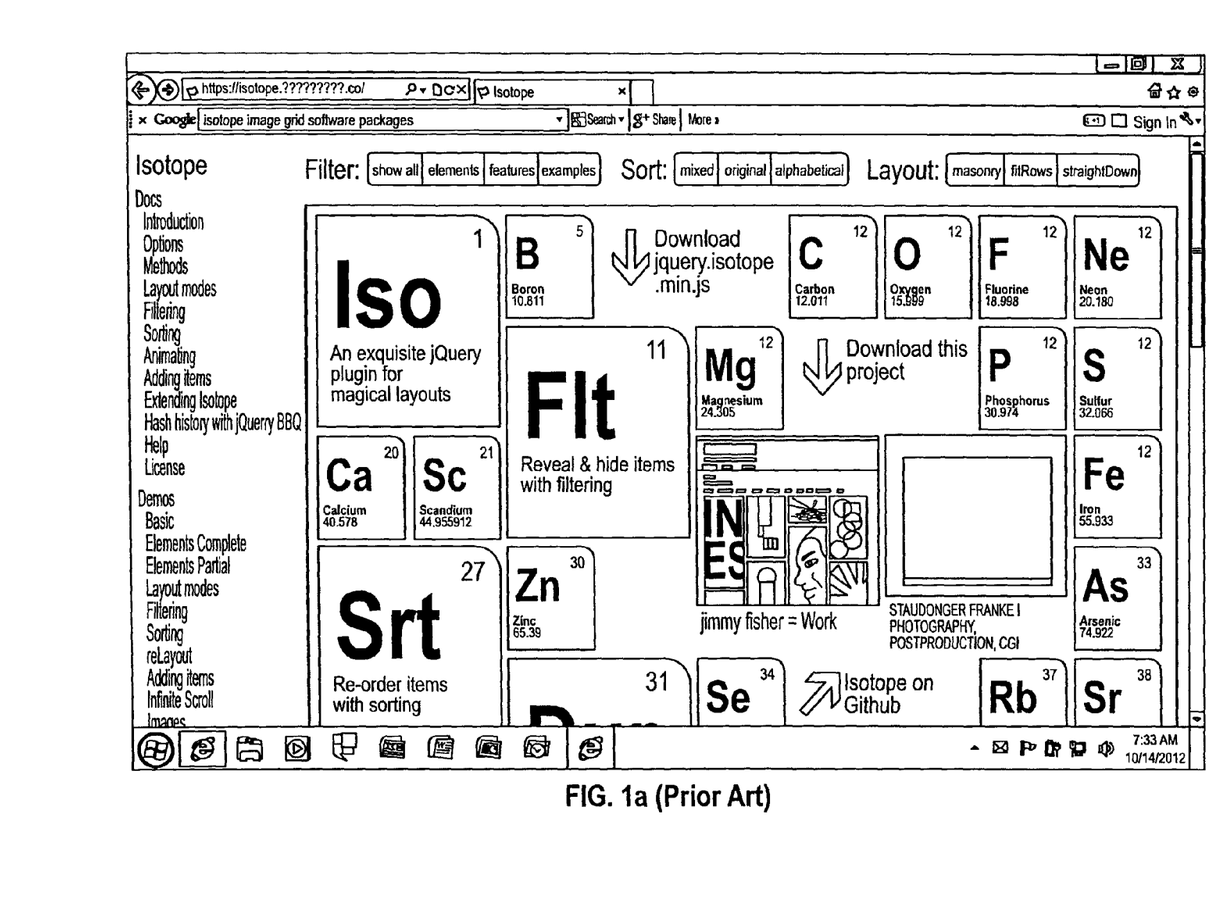
FIG. 1a illustrates a screen shot of prior art software package Isotope.
Figure 1B:
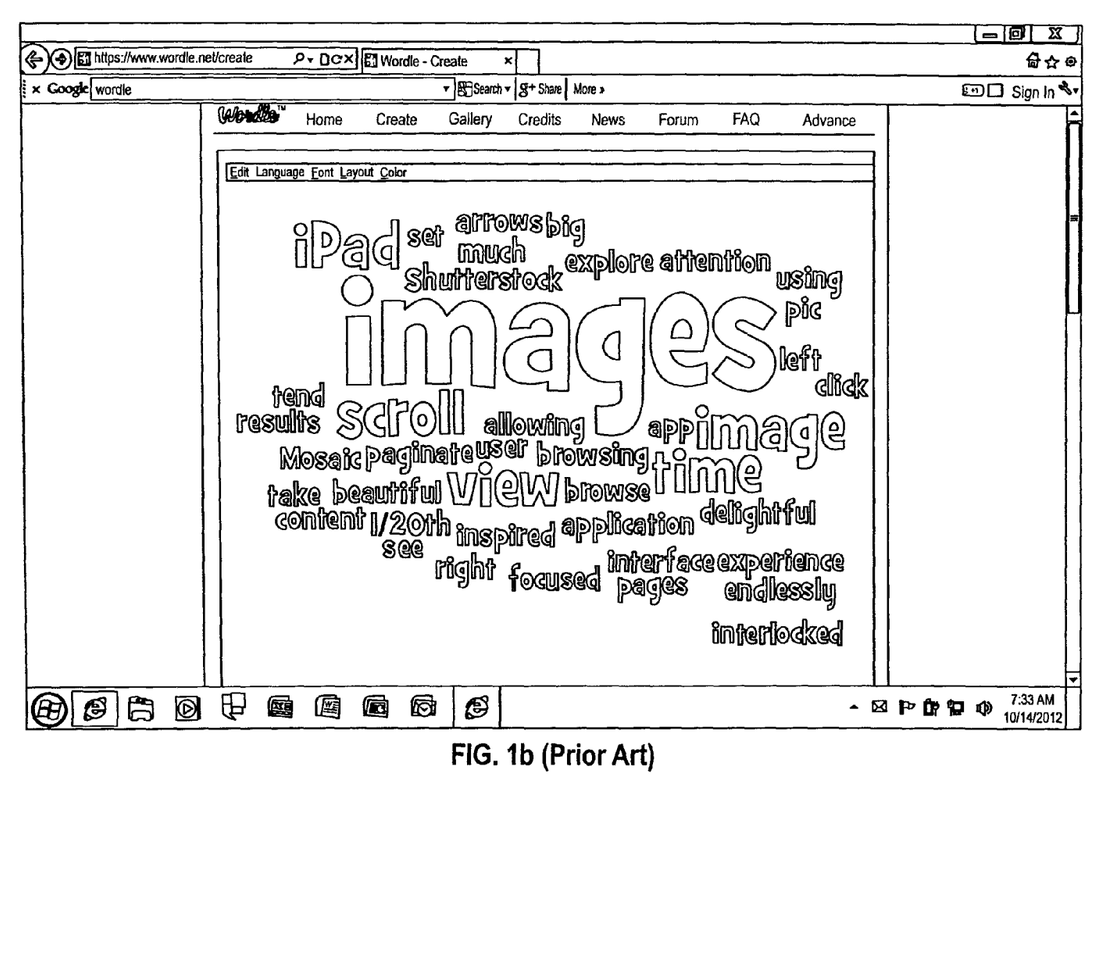
FIG. 1b illustrates a screen shot of prior art software package wordle.net.

The software package Isotope supporting dynamic visual sorting of images of chemical isotopes in a grid overcomes these limitations. FIG. 1a depicts a screen shot of search results generated by this application. However, Isotope does not support packing of images of different orientations together without gaps or reordering. FIG. 1a illustrates a screen shot of prior art software package Isotope. Further, images of words can also be arranged in mosaic fashion. For example, Wordle.net offers software for generating interesting displays of related text. FIG. 1b depicts a screen presenting a display of related terms that is generated by this application.

The first step in image management is to set max-width to 100% and let the height of the image adjust, which simultaneously maintains the aspect ratio of the image. However, this may introduce problems with maintaining the image hierarchy. For example, when a width aspect ratio of a banner image is squeezed down to fit a narrow column, the resulting image loses its previously designated position in the visual hierarchy of the page upon which the banner image is displayed. Thus, normally smaller inline images may appear larger, which in turn may result in inverting the visual hierarchy of the page. Because adaptability is based on the image width, horizontal images may require more scaling than vertical images. This can lead to a problem where scale between images can change. A horizontal image that is larger and more dominant in the visual hierarchy of the page displayed on a wide screen browser, may very well end up being displayed as a smaller and less dominant image on the narrow screen of a mobile device.

Both U.S. Pat. No. 8,200,039 B2 and U.S. Pat. No. 8,224,119 B2 teach stitching images together to form a mosaic or collage format displayed in a grid. U.S. Pat. No. 8,046,717 B1 teaches generating thumbnail images from rich content, where the thumbnail images can be combined in the form of a collage. U.S. Pat. No. 7,917,859 teaches generation of a photo collage and using weighted values associated with thumbnail images to rank relevancy of thumbnail images. U.S. Pat. No. 8,144,995 B2 teaches display of searched images in a grid format which has an appearance of a mosaic or collage. U.S. Pat. No. 7,797,377 B2 teaches a system for displaying a product associated with a media object such as image file, an audio file, and a video file, where the system is integrated with the user's preferences for the product. The patent further teaches an automatic display of a collage or mosaic display. U.S. Pat. No. 6,901,378 B1 teaches a collage or mosaic display of thumbnail photos based on a search and retrieval of relevant images based on metadata while integrating users' preferences for the product.

US 2010/0277754 A1 discloses an apparatus for generating a mosaic image, where a single image is obtained and segmented into a plurality of blocks according to density values for the basic colors. US 2012/0054649 A1 discloses a method and system for displaying images in a mosaic or collage format along a grid. US 2009/0064029 A1 discloses a method for displaying multiple digital objects such as images displayed in a matrix and scored on the matrix based on relevancy, and the more relevant images are located centrally to a viewer and the less relevant ones are located spatially outward. US 2008/0205789 A1 discloses a method for providing a photo collage where one embodiment is displayed in tiles. The display is dynamic using digital frames where the photo is changed based on the user input. US 2011/0074824 A1 discloses a display of images in a mosaic or collage where the image's aspect ratio is preserved. U.S. Pat. No. 8,078,969 B2 discloses a method for manipulation of image dimensions by the user in the image receiving area for displaying images in a collage format. U.S. Pat. No. 7,735,007 teaches methods for adding a removal of white spaces from a document as images are added to the document, by growing and shrinking the electronic page size.

However, the aforementioned patents fail to fit together as many large images as possible in a browser window without disrupting order of images resulting for various types of image sorts. Images are displayed as search results in the disclosed method, like any other search results, images may also be sorted by relevance, popularity etc. Resultantly, a user can view an interface displaying more image pixels displaying images with fewer gaps between the images. The disclosed method is compatible with various image sorting methods. For example, the disclosed method may support sorting methods including, but not limited to, the popular sort, relevancy sort, sort displaying newly searched images, random sort etc.

BRIEF SUMMARY

A method for displaying a dynamic mosaic of a set of searched media files, comprising: determining a height attribute, a width attribute and an aspect ratio attribute for each media file in the set of media files, determining a grid width attribute, iteratively processing each media file in the set of media files by performing the following steps: identifying a next media file which is to be displayed on the grid, determining an average height of the media files having a designated position on the grid and the next media file (media files), determining a modified width attribute of each of the media files, based on the average height and corresponding aspect ratio attribute of each of the media files, reconfiguring the media files such that each of the reconfigured media files has the average height and the corresponding modified width attribute, determining a total image width attribute of the media files by adding the corresponding modified width attribute of each of the media files, and while the total image width attribute is less than the grid width attribute, assigning a designated position to the next media file on the grid; and dynamically displaying each processed media file at a corresponding designated position on the grid.

DETAILED DESCRIPTION OF THE PRESENTLY PREFERRED EMBODIMENTS

The present disclosure describes a computer implemented image search system for rapid retrieval of media files images, the system is configured to determine a grid width attribute, and a height attribute, a width attribute and an aspect ratio attribute for each media file. The system configured to iteratively process each media file by determining a next media file, an average height and average width of the media files, reconfiguring the media files such that each of the reconfigured media files has the average height and the average width attribute, determining a total image width attribute of the media files by adding the average width attribute for each of the media files, and configured to assign a designated position to a next media file on the grid while the total image width attribute is less than the grid width attribute, and to dynamically display each processed media file at a corresponding designated position on the grid.

By way of introduction only, the present embodiments provide methods and systems for displaying a list of images of varying dimensions and aspect ratios in a mosaic grid, each grid entry having different dimensions, and for removing the white spaces between the images.

In one embodiment of the disclosed method a list of images with metadata is compiled. Metadata pertains to different attributes of image files including but not limited to: multiple representations, i.e., thumbnails, of each image, URLs or addresses pointing to binary data for each thumbnail, the height attribute and the width attribute associated with each thumbnail, and the like. Next, the process of compilation is initiated, the process operates on each image in the list of candidate images which are to be displayed on an empty grid space. A mosaic pattern of images is compiled by looping through the images with their associated metadata and depositing them in an empty grid space. The fit of a candidate image to a particular grid space may be determined by the aspect ratio and the crop tolerance of the candidate image.

Next, a minimum acceptable size is calculated for a candidate image after considering the aspect ratio of a candidate image. For landscape images, the minimum acceptable width is the minimum dimension (e.g. 150 points) and the minimum acceptable height is the minimum dimension (e.g. 150 points) multiplied by the aspect ratio. For portrait images, the minimum acceptable height is the minimum dimension (e.g. 150 points) and the minimum acceptable width is the minimum dimension (e.g. 150 points) multiplied by the aspect ratio.

Next, a maximum acceptable size for the candidate image is calculated based on the aspect ratio of the candidate image. For landscape images, the maximum acceptable width is the maximum dimension (e.g. 450 points) and the maximum acceptable height is the maximum dimension (e.g. 450 points) multiplied by the aspect ratio. For portrait images, the maximum acceptable height is the maximum dimension (e.g. 450 points) and the maximum acceptable width is the maximum dimension (e.g. 450 points) multiplied by the aspect ratio. After calculating a maximum acceptable size for the candidate image, the calculated image dimensions of the candidate image are tested for appropriateness.

The appropriateness test is a two prong test. It is essential that (1) the width and the height of the candidate image must be greater than the minimum acceptable size, and (2) the width and the height of the candidate image must be less than the maximum acceptable size for the empty grid space. Should the candidate image fail either test, the candidate image is placed on a list of unused images. Subsequently, an attempt is made at a later time to place all the images in the list of unused images on the grid.

Should the candidate image pass both these tests, the thumbnail size is selected that best matches the empty grid space sought to be filled by the candidate image. Otherwise if the empty grid space width or height is larger than the minimum dimension (e.g. 150 points) added to a maximum scaling up tolerance (e.g. 50 points), a larger thumbnail may be used. Alternatively, if the empty grid space width or height is smaller or equal to the minimum dimension (e.g. 150 points) added to a maximum scaling up tolerance (e.g. 50 points), a smaller thumbnail may be used.

Thereafter, a crop tolerance is calculated in order to prevent excessive cropping of the images. First, an attempt is made to determine the location where a new image is to be placed on the empty grid space. If there are no other images on the grid, that is if the grid is completely empty, then the new image is positioned at the top left portion of the grid. Otherwise, if other images exist on the grid, and if the new image has the same height as the last image that was positioned in the empty grid space (last image), then the new image will be positioned to the right of the last image. However, if the new image has the same width as the last image, then the new image will be positioned beneath the last image.

At this point, the entire grid having several images positioned upon it in the manner described above appears like a mosaic of images. Then, the mosaic is tested to determine whether the dimensions of the mosaic with the newly added image exceed the boundaries of the available space, which is calculated by adding the empty grid space to a crop tolerance (e.g. 0.2) parameter. If the dimensions of the mosaic exceed the boundaries of the available space, then the newly added image is removed from the mosaic and is added to the list of unused images, which may possibly be placed on the grid at a later time. Alternatively, if the dimensions of the mosaic do not exceed the boundaries of the available space, then the newly added image is retained on the mosaic, and the process moves on to consider the next candidate image.

Thousands of images may be returned in a typical search result. The disclosed method employs the following features to enable the user to scroll quickly through the search results or to jump to the middle of the search results without having to store every image in the search results in the system memory. The disclosed method may maintain a record of edge sets. An edge is a 1-point-wide rectangle that is the same height and in the same position as the side of an image. An edge set is a list of edges representing the boundary of one part of the larger mosaic. An edge set might represent edges of several different images. Furthermore, if image data is unknown, an edge set might contain a single edge that is the entire height of the screen.

Notably, given an empty screen in the middle of a result set, there will be a set of edges. For identifying images to the left, the edge set record may contain the rightmost position of the image and the height of the image. Likewise, for identifying images to the right, the edge set record may contain the leftmost position of the image and the height of the image. If data about images to the left or right is not known, the edge set record may contain a single image wherein, the height of the image equals to the height of the entire screen.

The disclosed method may use the edge sets as a guide while determining where to position a new candidate image. This feature of the disclosed method is implemented in two steps. In the first step, the process ensures that if the candidate image is positioned at a desired position, then the candidate image would not overlap with any of the edges in the edge sets to the right or left side of the desired position of the candidate image on the screen. In the second step, the method uses edges to generate a rectangle wherein, the height of the rectangle is equal to the height of the space that is to be filled. For example, for an edge that is 50 points high and located at the left side of the desired position for the candidate image, a corresponding rectangle is generated to the right side of the edge that is 50 points tall. It is noted that while the height attribute of the generated rectangle is defined in the aforementioned manner, the width attribute may have an arbitrary value.

Figure 2A:
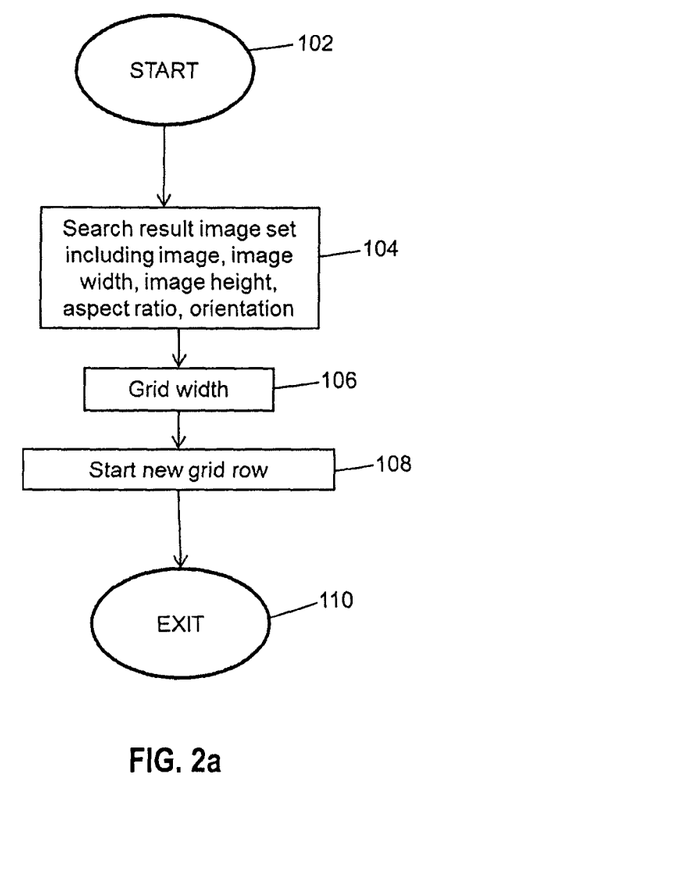
FIG. 2a illustrates a state diagram showing operations performed in the processing a search result image set.

Now referring to FIG. 2a illustrating a state diagram showing operations performed in processing a search result image set. The process begins at step 102, when a set of images is received by the method as a media search result. This process iteratively processes each image in the received set of images by performing the actions enumerated in the following steps. At step 104, the method determines a height attribute, a width attribute and an aspect ratio attribute for each media file in the received set of images. The method determines a grid width attribute at step 106. Grid width attribute indicates total width of the grid space. Thereafter, the process starts a new row on the grid at step 108. All the images in the received set of images may possibly be placed in a row on the grid. The manner in which a new row is started on the gird is described in detail below in conjunction with FIG. 2b. After starting a new grid row, the process exits at step 110.

Figure 2B:
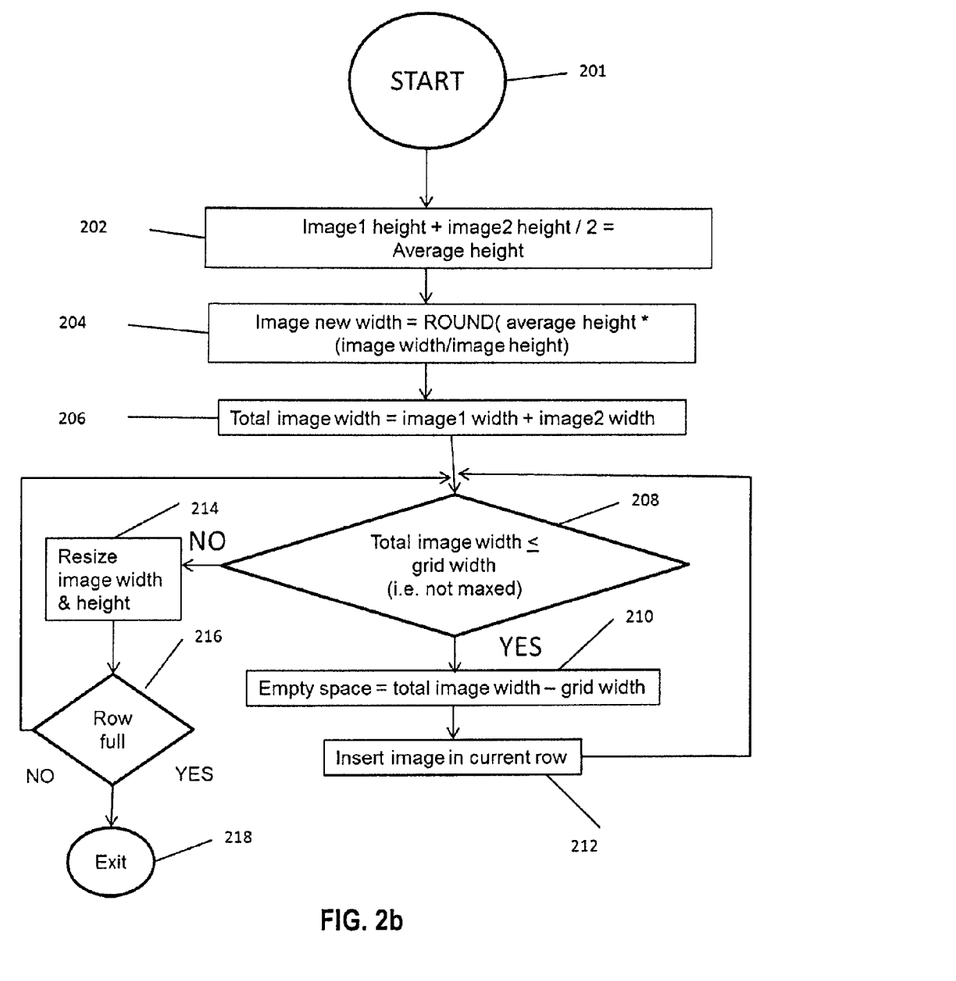
FIG. 2b depicting a state diagram showing operations performed in the starting a new row on the grid.

Referring now to FIG. 2b depicting a state diagram showing operations performed in starting a new row on the grid. The process begins at step 201. The process identifies a next media file which is to be displayed on the grid. In this diagram, image 1 is a file having a designated position on the grid, and image 2 is a next file to be displayed on the grid. At step 202, an average height of the image 1 and image 2 is determined. At step 204, new image width for the image 1 and image 2 is determined by (1) dividing image width by image height (2) multiplying the result by the average height and (3)

rounding the result. Thereafter, image 1 and image 2 are reconfigured such that the reconfigured image 1 and image 2 have the average height (determined in step 202) and the new width attribute (determined in step 204). At step 206, a total image width attribute image 1 and image 2 is computed by adding the average width attributes of image 1 and image 2. In another embodiment, at step 204, a modified width attribute is calculated for image 1 and image 2. The modified width attribute is calculated for image 1 and image 2 based on the average height determined in step 202 and corresponding aspect ratio attribute of image 1 and image 2. Thereafter, image 1 and image 2 are reconfigured such that the reconfigured image 1 and image 2 have the average height (determined in step 202) and the corresponding modified width attribute (determined in step 204). At step 206, a total image width attribute image 1 and image 2 is computed by adding the corresponding modified width attribute of image 1 and image 2.

Then, at step 208 the process determines if the total image width attribute is less than or equal to the grid width attribute. If it is determined that the total image width attribute is less than or equal to the grid width attribute, then the process moves to step 210. An empty space attribute is calculated at step 210 by subtracting total image width from grid width. If empty space has a positive value then the process moves to step 212 where image 2 is inserted in the current row. Notably, inserting image 2 in the current row implies assigning to image 2 a designated position on the grid. The manner in which a new image is inserted in an existing row is described in detail below in conjunction with FIG. 3. After each file in the received image file set is processed, then each processed media file is dynamically displayed at a corresponding designated position on the grid.

Alternatively, if empty space has a negative value (or a zero value) then the process moves to step 214, where image 1 and image 2 are resized. Then the process moves to step 216 to check if a current row is full. On the other hand, if the current row is not full, then the process moves to step 208, otherwise the process exits at step 218. Note that the next image file (i.e. image) is not inserted in the current row at this point. As described above, image 2 is placed on a list of unused images for possible subsequent placement.

Figure 3:
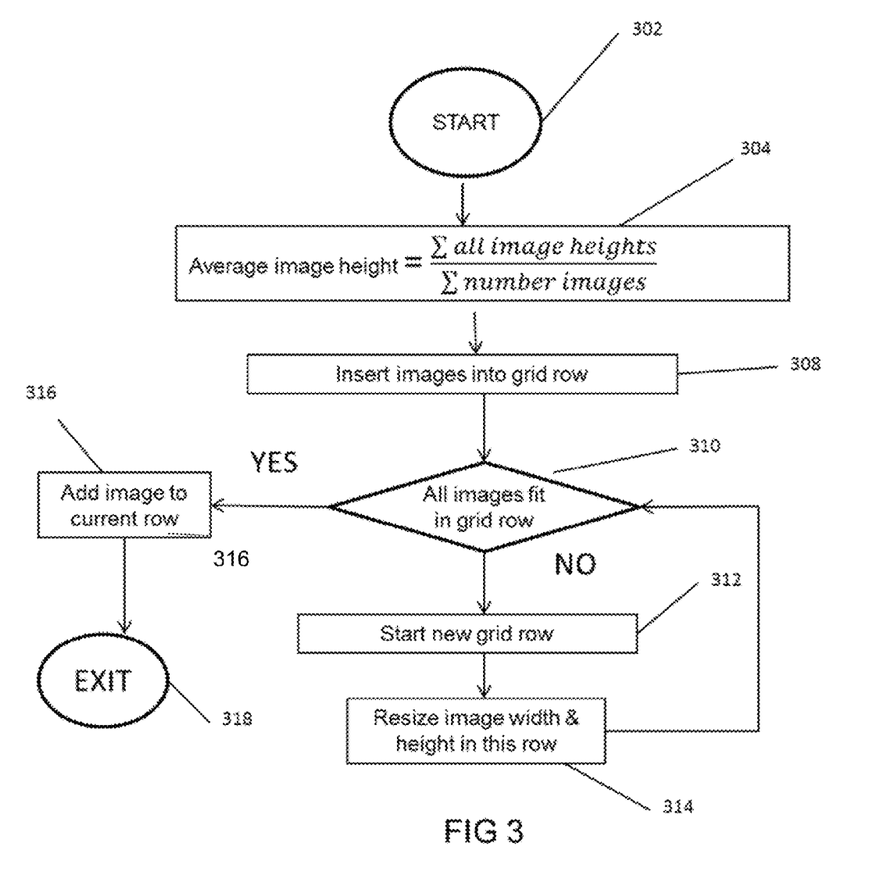
FIG. 3 illustrates the manner in which a new image is inserted in an existing row.

FIG. 3 illustrates the manner in which a new image is inserted in an existing row. The process begins at step 302. At step 304, an average image height is calculated by dividing the sum of all image heights by the number of images. Then, at step 308 a new image is inserted into a grid row. At step 310 it is determined whether all images (which includes images that have previously been placed on the grid and newly inserted images) fit in the current grid row. If all of the images fit in grid row, then new image is added to the current row at step 316, and process exits at step 318. Alternatively, if all of the images do not fit in grid row, then a new row is started at step 312. At step 314, after resizing image height and width in the current row, the process returns to step 310.

Figure 4A:
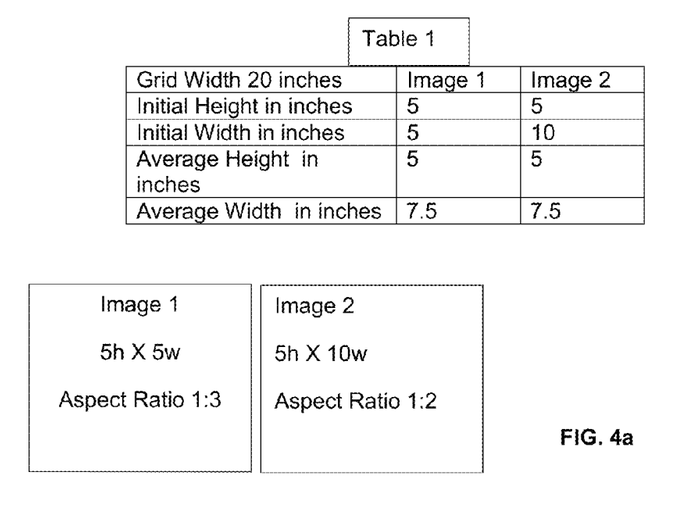
FIG. 4a depicts reconfiguration of images according to one embodiment of the disclosed method.

Now referring to FIG. 4a depicting reconfiguration of images according to one embodiment of the disclosed method. Table 1 displays Image 1 having initial height 5 inches and initial width 5 inches. Table 1 also displays Image 2 having initial height 5 inches and initial width 10 inches. In this embodiment, the method calculates an average height for Image 1 and Image 2 by adding the heights of both the Images and dividing the sum by total number of images, which is 5 inches. Similarly, average width is calculated for Image 1 and Image 2 which is 7.5 inches. This embodiment places the two images on the grid after calculating an average height and width for both the images.

Figure 4B:
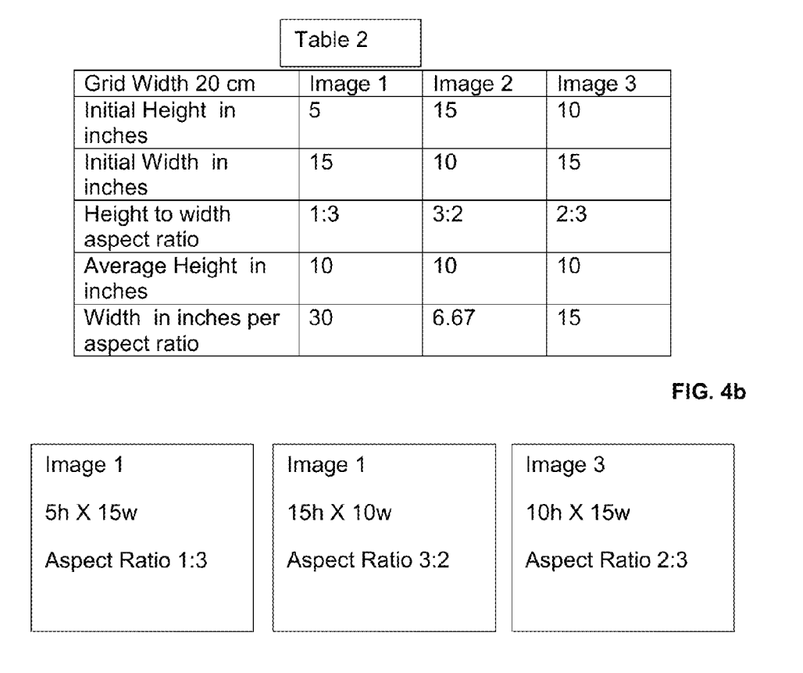
FIG. 4b illustrates reconfiguration of images according to another embodiment of the disclosed method.

Now referring to FIG. 4b, illustrating reconfiguration of images according to another embodiment of the disclosed method. In contrast to FIG. 4a, in the embodiment illustrated in FIG. 4b, the images are processed in three steps. (1) Average height is calculated for each candidate image that is to be placed on the grid. In this case, the average height for Image 1, Image 2, and Image 3 is 10 inches. (2) Next, the height to width ratio is considered for each candidate image. (3) Width per aspect ratio is calculated for each candidate image based on the average height and the aspect ratio. For example, for Image 1, the average height is 10 inches, and the aspect ratio is 1:3. Accordingly, the new width for Image 1 according to width per aspect ratio is 30 inches. Similarly, for Image 2, the average height is 10 inches, and the aspect ratio is 3:2. Similarly, the width for Image 2 is calculated to be 6.67 inches. Finally, for Image 3, the average height is 15 inches, and the aspect ratio is 2:3. Since the initial height for Image 3 is same as average height, the width per aspect ratio for Image 3 remains the same as the initial width for Image 3, which is 15 inches.

Figure 5:
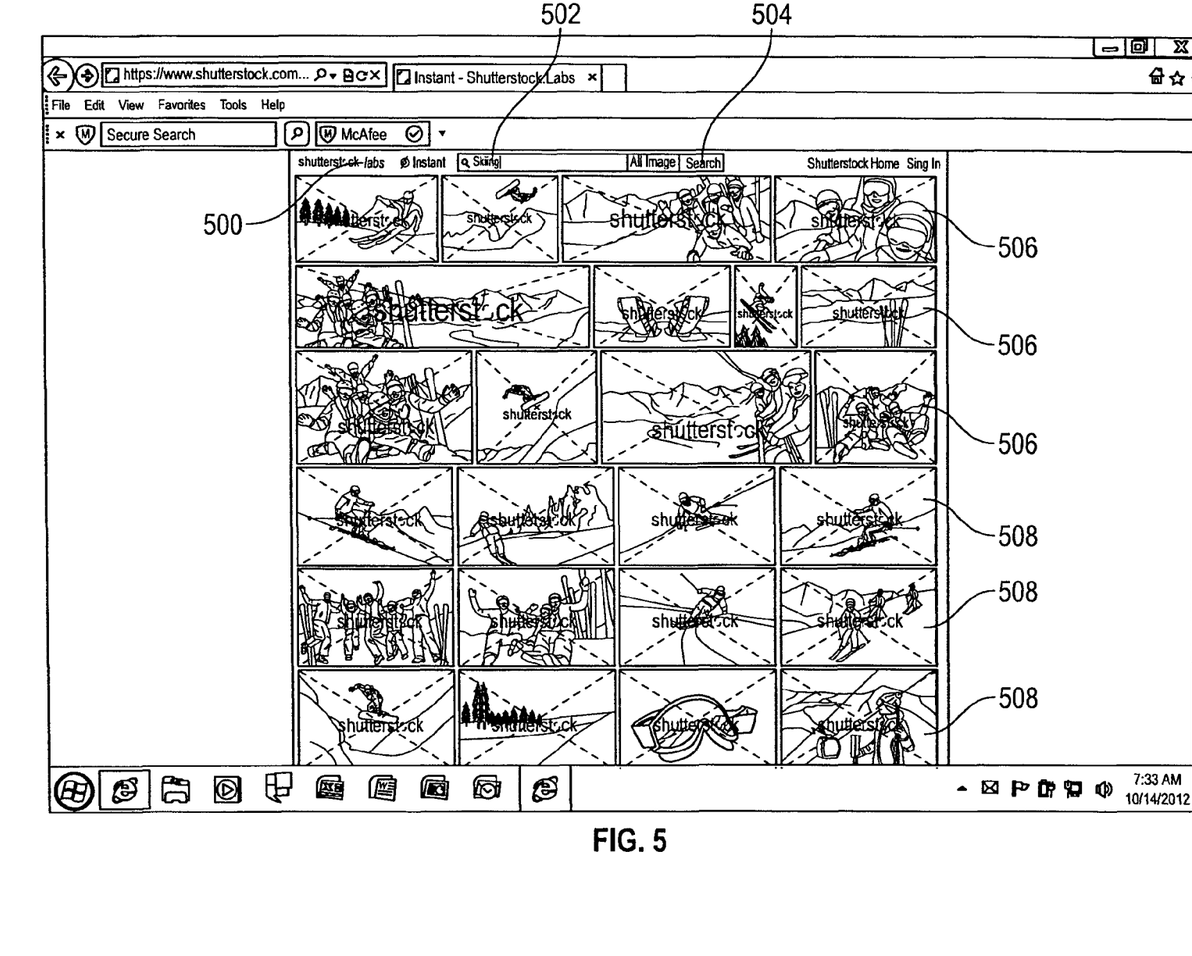
FIG. 5 is a screen shot illustrating display of search results according to embodiments disclosed in FIGS. 4a and 4b.

FIG. 5 is a screen shot illustrating display of search results according to embodiments disclosed in FIGS. 4a and 4b. A user enters a search request in a search box 502 located on a user interface 500, and selects a search button 504. Search results are generated and displayed on the user interface 500. The first three rows 506 of the search results on the user interface 500 contain images that have same height but different width. Even though all images in the first three rows 506 have same height, some images are wider than the others. This is because the images in the first three rows 506 have been processed using the steps described in FIG. 4b. In contrast, each image in the last three rows 508 on the user interface 500 has the same height and the same width, this is because the images in the last three rows 508 have been processed using the steps described in FIG. 4a.

Figure 6:
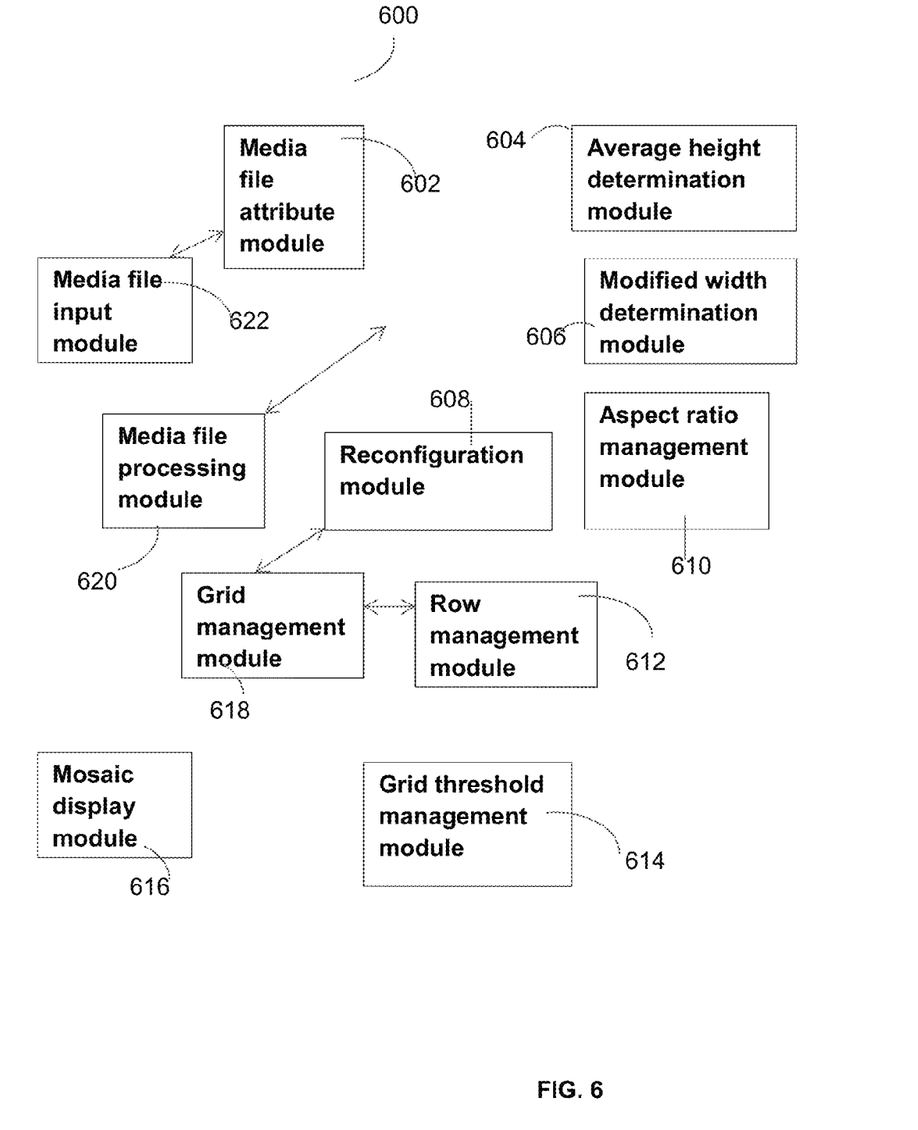
FIG. 6 is a block diagram of the disclosed Mosaic display system for intelligent media search.

Referring now to FIG. 6, which is a block diagram of the disclosed Mosaic display system for intelligent media search. FIG. 6 depicts a system 600 for displaying a dynamic mosaic of a set of searched media files, the system comprises at least one processor, and at least one computer-readable storage medium encoded with executable instructions that, when executed by the at least one processor, causes the at least one processor to perform steps, the system comprising the following elements. A media file input module 622 is configured to receive a set of searched media files. A media file attribute 602 module is configured to determine a height attribute, a width attribute for each received media file. An aspect ratio attribute module 610 is configured to determine aspect ratio attribute for each media file in the set of media files. A grid management module 618 is configured to determine a grid width attribute, and monitor display of media files on the grid. The grid management module 618 is further configured to dynamically display the reconfigured next media file on a new row on the grid if the total image width attribute is greater than the grid width attribute.

A grid threshold management module 614 is configured to determine an insertion of media files on the grid. Furthermore, a row management module 612 is configured to determine a total image width attribute of the media files by adding the corresponding modified width attribute of each of the media files. A media file processing module 620 configured to iteratively process each media file in the set of media files and to identify a next media file which is to be displayed on the grid. An average height determination module 604 is configured to determine an average height of the media files already having a designated position on the grid and the next media file (media files).

A modified width determination module 606 is configured to determine a modified width attribute of each of the media files, based on the average height and corresponding aspect ratio attribute of each of the media files. A reconfiguration module 608 is designed to reconfigure the media files such that each of the reconfigured media files has the average height and the corresponding modified width attribute. The reconfiguration module 608 is designed to reconfigure media files such that the content of the original media file is identical to the content of the reconfigured media file displayed on the grid, and the reconfiguration of a given media file indicates modification of the media file according to the aspect ratio of the given media file.

A mosaic display module 616 is configured to cause dynamic display of each of the reconfigured media files on the grid. The mosaic display module 616 of system 600 is further configured to display on a given row all media files having same height, and to display the media files on the grid such that all four edges of the grid are even. The mosaic display module 616 of system 600 is further configured to display media files on the grid in a specific order in which the media files are received.

The system 600 further configured to group the media files into rows that span the width of the grid. Further, the system 600 is configured to display media files such that media files on same rows have same height, the media files on distinct rows have different height, and entire content of the media file is displayed on the grid. The system 600 is further configured to group together media files of varying sizes and orientations and to display media files such that a specific amount of space is situated between each of the media files displayed on the grid. The system 600 is also configured to reconfigure each media file in a given row while adding a new next media file to the given row on the grid. The system 600 is configured to calculate empty space by subtracting the grid width attribute from the total image width attribute. The system 600 is further configured to reconfigure the width attribute and the height attributes of the media files if the empty space is less than the grid threshold value attribute.

The disclosed system has many advantages over the prior art systems. Images are grouped into rows that span the width of the containing box or the grid. Another benefit is that images are not grouped into columns, and all four edges of the grid are even. Further, the system does not reorder images from right to left. The system advantageously places the same amount of space between the images and does not crop any of the images. The system maintains the original image aspect ratios and groups images of varying sizes and orientations are together.

The invention claimed is:

1. A system for displaying a dynamic mosaic of a set of searched media files, comprising: at least one processor; and at least one non-transitory computer-readable storage medium encoded with executable instructions that, when executed by the at least one processor, causes the at least one processor to provide a dynamic mosaic display of a set of searched media files, the system comprising:
   a media file input module configured to receive a set of searched media files;
   a media file attribute module configured to determine a height attribute and a width attribute of the set of searched media files;
   an aspect ratio attribute module configured to determine an aspect ratio attribute for each media file in the set of searched media files;
   a grid management module configured to determine a grid width attribute, and monitor display of media files on the grid;
   a grid threshold management module configured to determine an insertion of media files on the grid;
   a row management module configured to determine a total image width attribute of the media files by adding the corresponding modified width attribute of each of the media files;
   a media file processing module configured to iteratively process each media file in the set of media files and to identify a next media file which is to be displayed on the grid;
   an average height determination module configured to determine an average height of the media files already having a designated position on the grid and the next media file or media files;
   a modified width determination module configured to determine a modified width attribute of each of the media files, based on the average height and corresponding aspect ratio attribute of each of the media files;
   a reconfiguration module configured to reconfigure the media files such that each of the reconfigured media files has the average height and the corresponding modified width attribute; and
   a mosaic display module configured to dynamically display each of the reconfigured media files on the grid while the total image width attribute is less than the grid width attribute.

2. The system of claim 1, wherein the grid management module is further configured to dynamically display the reconfigured next media file on a new row on the grid if the total image width attribute is greater than the grid width attribute.

3. The system of claim 1, further configured to group the media files into rows that span the width of the grid.

4. The system of claim 3, further configured to display on a given all media files row having same height, and to display the media files on the grid such that all four edges of the grid are even.

5. The system of claim 4, further configured to display media files such that media files on same rows have same height, the media files on distinct rows have different height, and entire content of the media file is displayed on the grid.

6. The system of claim 4, further configured to display media files such that the content of the original media file is identical to the content of the reconfigured media file displayed on the grid, and the reconfiguration of a given media file indicates modification of the media file according to the aspect ratio of the given media file.

7. The system of claim 1, further configured to display media files on the grid in a specific order in which the media files are received.

8. The system of claim 1, further configured to group together media files of varying sizes and orientations and to display media files such that a specific amount of space is situated between each of the media files displayed on the grid.

9. The system of claim 1, further configured to reconfigure each media file in a given row while adding a new next media file to the given row on the grid.

10. The system of claim 1, further configured to calculate empty space by subtracting the grid width attribute from the total image width attribute.

11. The system of claim 10, further configured to reconfigure the width attribute and the height attributes of the media files if the empty space is less than the grid threshold value attribute.

12. A method for displaying a dynamic mosaic of a set of searched media files, the method comprising:
- determining a height attribute, a width attribute and an aspect ratio attribute for each media file in the set of media files;
- determining a grid width attribute;
- iteratively processing each media file in the set of media files by performing the following steps:
  - identifying a next media file which is to be displayed on the grid,
  - determining an average height of the media files having a designated position on the grid and the next media file or media files,
  - determining a modified width attribute of each of the media files, based on the average height and corresponding aspect ratio attribute of each of the media files,
  - reconfiguring the media files such that each of the reconfigured media files has the average height and the corresponding modified width attribute,
  - determining a total image width attribute of the media files by adding the corresponding modified width attribute of each of the media files, and
  - while the total image width attribute is less than the grid width attribute, assigning a designated position to the next media file on the grid; and
- dynamically displaying each processed media file at a corresponding designated position on the grid.

13. The method of claim 12, further comprising dynamically displaying the reconfigured next media file on a new row on the grid if the total image width attribute is greater than the grid width attribute.

14. The method of claim 12, wherein the media files are grouped into rows that span the width of the grid.

15. The method of claim 14, wherein all media files displayed on a given row have same height, and all four edges of the grid are even.

16. The method of claim 15, wherein distinct rows may have different height and entire content of the media file is displayed on the grid.

17. The method of claim 15, wherein the content of the original media file is identical to the content of the reconfigured media file displayed on the grid, and the reconfiguration of a given media file indicates modification of the media file according to the aspect ratio of the given media file.

18. The method of claim 12, further comprising displaying the media files on the grid in a specific order in which the media files are received.

19. The method of claim 12, wherein media files of varying sizes and orientations are grouped together and a specific amount of space is situated between each of the media files displayed on the grid.

20. The method of claim 12, further comprising reconfiguring each media file in a given row while adding a new next media file to the given row on the grid.

21. The method of claim 12, further comprising calculating empty space by subtracting the grid width attribute from the total image width attribute.

22. The method of claim 21, further comprising determining that empty space exists on the grid, and adding more images until empty space does not exist on the grid.

23. The method of claim 22, further comprising reconfiguring the width attributes and the height attributes of the media files each time a new image is added to the grid.

24. A method for displaying a dynamic mosaic of a set of searched media files, the method comprising:
- determining a height attribute, a width attribute and an aspect ratio attribute for each media file in the set of media files;
- determining a grid width attribute;
- iteratively processing each media file in the set of media files by performing the following steps:
  - identifying a next media file which is to be displayed on the grid,
  - determining an average height and average width of the media files having a designated position on the grid and the next media file or media files,
  - reconfiguring the media files such that each of the reconfigured media files has the average height and the average width attribute,
  - determining a total image width attribute of the media files by adding the average width attribute of each of the media files, and
  - while the total image width attribute is less than the grid width attribute, assigning a designated position to the next media file on the grid; and
- dynamically displaying each processed media file at a corresponding designated position on the grid.

25. The method of claim 24, further comprising dynamically displaying the reconfigured next media file on a new row on the grid if the total image width attribute is greater than the grid width attribute.

26. The method of claim 24, wherein the media files are grouped into rows that span the width of the grid.

27. The method of claim 26, wherein all media files displayed on a given row have same height, and all four edges of the grid are even.

28. The method of claim 27, wherein distinct rows may have different height and entire content of the media file is displayed on the grid.

29. The method of claim 27, wherein the content of the original media file is identical to the content of the reconfigured media file displayed on the grid, and the reconfiguration of a given media file indicates modification of the media file according to the aspect ratio of the given media file.

30. The method of claim 24, further comprising displaying the media files on the grid in a specific order in which the media files are received.

31. The method of claim 24, wherein media files of varying sizes and orientations are grouped together and a specific amount of space is situated between each of the media files displayed on the grid.

32. The method of claim 24, further comprising reconfiguring each media file in a given row while adding a new next media file to the given row on the grid.

33. The method of claim 24, further comprising calculating empty space by subtracting the grid width attribute from the total image width attribute.

34. The method of claim 33, further comprising determining that empty space exists on the grid, and adding more images until empty space does not exist on the grid.

35. The method of claim 34, further comprising reconfiguring the width attributes and the height attributes of the media files each time a new image is added to the grid.

* * * * *

UNITED STATES PATENT AND TRADEMARK OFFICE
CERTIFICATE OF CORRECTION

PATENT NO. : 9,183,215 B2  
APPLICATION NO. : 13/730896  
DATED : November 10, 2015  
INVENTOR(S) : Eric J. Smiling Page 1 of 1

It is certified that error appears in the above-identified patent and that said Letters Patent is hereby corrected as shown below:

TITLE PAGE:

Under (72) Inventor:

Change "New York, NY" to --Jersey City, NJ--.

IN THE CLAIMS:

Col. 10, Line 17;

Change "or media files;" to --or (media files);--.

Col. 11, Line 13;

Change "or media files," to --or (media files),--.

Signed and Sealed this  
Fifth Day of July, 2016

Michelle K. Lee  
*Director of the United States Patent and Trademark Office*